(12) United States Patent
Kikuchi

(10) Patent No.: US 12,389,070 B2
(45) Date of Patent: Aug. 12, 2025

(54) GENERATION OF GROUP FOR VIEWERS OF VIDEO TO COMMUNICATE WITH EACH OTHER

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/921,806

(22) PCT Filed: May 25, 2022

(86) PCT No.: PCT/JP2022/021341
§ 371 (c)(1),
(2) Date: Oct. 27, 2022

(87) PCT Pub. No.: WO2023/228297
PCT Pub. Date: Nov. 30, 2023

(65) Prior Publication Data
US 2025/0056094 A1 Feb. 13, 2025

(51) Int. Cl.
*H04N 21/454* (2011.01)
*H04N 21/45* (2011.01)
*H04N 21/478* (2011.01)
*H04N 21/4788* (2011.01)

(52) U.S. Cl.
CPC ....... *H04N 21/454* (2013.01); *H04N 21/4532* (2013.01); *H04N 21/47815* (2013.01); *H04N 21/4788* (2013.01)

(58) Field of Classification Search
CPC ............ H04N 21/454; H04N 21/4532; H04N 21/47815; H04N 21/4788
See application file for complete search history.

(56) References Cited

U.S. PATENT DOCUMENTS

2002/0120516 A1* 8/2002 Sakagami ............... G06F 17/60
2021/0152854 A1   5/2021 Shibata

FOREIGN PATENT DOCUMENTS

| JP | 2016-197411 A | 11/2016 | |
| JP | 2021-081882 A | 5/2021 | |
| WO | WO 2022/011293 A1 * | 1/2022 | ............. G06Q 50/10 |

OTHER PUBLICATIONS

"What is a cafe?", Sony, Feb. 13, 2011, 6 pgs., <https://web.archive.org/web/20110213071531/http://acafe.msc.sony.jp/about/index.html>.
International Search Report for PCT/JP2022/021341 dated, Aug. 30, 2022 (PCT/ISA/210).

* cited by examiner

*Primary Examiner* — Anthony Bantamoi
(74) *Attorney, Agent, or Firm* — Sughrue Mion, PLLC

(57) ABSTRACT

The generator (141) generates a group (for example, a group chat) for viewers of a video introducing a product to interact with each other on social media (for example, a messenger service). The detector (142) detects a viewer who has viewed the video introducing the product and purchased the product. The registrar (145) then registers the viewer detected by the detector (142) to the group generated by the generator (141).

8 Claims, 18 Drawing Sheets

FIG. 4

| | 131a | 131b | 131c | 131d | 131e |
|---|---|---|---|---|---|
| VIDEO ID | PRODUCT ID | PRODUCT NAME | STREAMER ID | GROUP ID | ... |
| VD-123ABC | PD-AAA123 | PROJECTOR | ST-ABC | GP-001ABC | ... |
| VD-234BCD | PD-BBB234 | LIPSTICK | ST-BCD | GP-234DEF | ... |
| VD-345CDE | PD-CCC345 | LAPTOP PC | ST-CDE | GP-555GHI | ... |
| VD-456DEF | PD-DDD456 | IH COOKER | ST-DEF | GP-789JKL | ... |
| VD-567EFG | PD-EEE567 | PORTABLE BATTERY | ST-EFG | GP-999ZZZ | ... |
| ... | ... | ... | ... | ... | ... |

| VIEWER ID | NAME | ADDRESS | VIEWED VIDEO ID | VIEWED DATE AND TIME | ... |
|---|---|---|---|---|---|
| VW-A123 | ** HANAKO | **WARD, TOKYO | VD-456DEF | 04/02 13:05 | ... |
|  |  |  | VD-999ZZZ | 04/01 21:10 | ... |
|  |  |  | ... | ... |  |
| VW-B234 | ** TARO | **CITY, OSAKA | VD-987ZYX | 03/30 22:35 | ... |
|  |  |  | VD-567EFG | 03/27 23:15 | ... |
|  |  |  | ... | ... |  |
| VW-C345 | ** JIRO | **CITY, KYOTO | VD-123ABC | 03/27 17:15 | ... |
|  |  |  | VD-555GGG | 03/26 18:45 | ... |
|  |  |  | ... | ... |  |
| VW-D456 | ** NATSUMI | **CITY, KANAGAWA | VD-777LMN | 04/01 21:25 | ... |
|  |  |  | VD-234BCD | 03/31 23:10 | ... |
|  |  |  | ... | ... |  |
| VW-E567 | ** SABURO | **CITY, HOKKAIDO | VD-345CDE | 04/03 10:50 | ... |
|  |  |  | VD-789XYZ | 04/02 11:25 | ... |
|  |  |  | ... | ... |  |
| : | : | : | : | : | : |

| VIEWER ID | | | | | |
|---|---|---|---|---|---|
| VW-A123 | | | | | |
| | PURCHASED PRODUCT ID | PURCHASED PRODUCT NAME | PURCHASE DATE AND TIME | PURCHASED PRICE | ... |
| | PD-DDD456 | IH COOKER | 04/02 13:35 | 20,000 YEN | ... |
| | PD-EFG777 | SWEATER | 03/26 20:40 | 10,000 YEN | ... |
| | PD-XYZ789 | SPRING WATER | 03/19 13:05 | 2,000 YEN | ... |
| | PD-ZZZ999 | BODY SCALE | 03/12 22:10 | 5,000 YEN | ... |
| | ... | ... | ... | ... | ... |

| GROUP ID | USER ID | STATE | ... |
|---|---|---|---|
| GP-001ABC | VW-A123 | REGISTERED | ... |
| | VW-G555 | REGISTERED | ... |
| | VW-J777 | REGISTRATION CANCELED | ... |
| | VW-N789 | REGISTERED | ... |
| | : | : | ... |
| | ST-ABC | REGISTERED | ... |

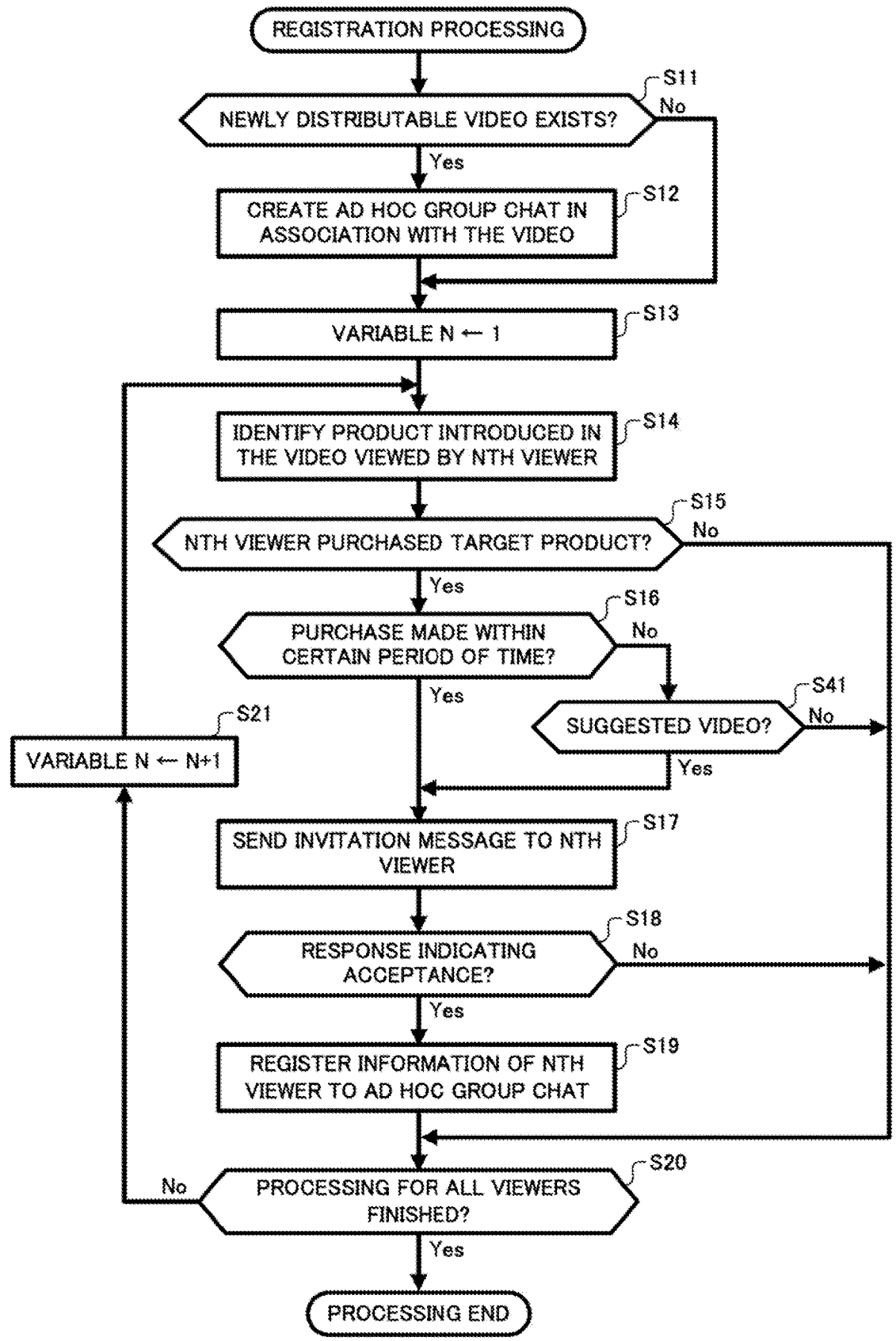

GENERATION OF GROUP FOR VIEWERS OF VIDEO TO COMMUNICATE WITH EACH OTHER

CROSS REFERENCE TO RELATED APPLICATIONS

This application is a National Stage of International Application No. PCT/JP2020/021341 filed May 25, 2022.

TECHNICAL FIELD

This disclosure relates to generating a group for viewers of a video to interact with each other.

BACKGROUND ART

In recent years, electric commerce, known as "live commerce," has been attracting attention. This live commerce is electric commerce in which a streamer distributes a live video introducing a product, and a viewer who is viewing the live video can purchase the introduced product.

For example, Patent Literature 1 discloses a system that can promote entry of new viewers into a video distribution service. In this system, a message received from a viewer (a message relating to the live video) is automatically posted to SNS during the live video distribution, and what is going on in the video distribution is notified to a user who is not viewing the live video (a new viewer). In addition, the message posted to SNS has a link to the live video, so that an interested user can follow the link from the message and view the live video.

CITATION LIST

Patent Literature

Patent Literature 1: Unexamined Japanese Patent Application Publication No. 2021-81882

SUMMARY OF INVENTION

Technical Problem

In the system disclosed in Patent Literature 1 described above, a viewer's message is automatically posted to SNS to encourage a new viewer to view a live video. Through such SNS, viewers can also be expected to interact with each other.

However, because ordinary SNS allow non-viewers to post messages freely, inappropriate messages are often posted, hindering viewers from engaging in beneficial interactions with each other.

The present disclosure is made to solve the above-described problem, and the objective of the present disclosure is to provide generation of a group that can promote beneficial interaction among viewers.

Solution to Problem

A server device according to a first aspect of the present disclosure comprises one or more processors, wherein at least one of the one or more processors performs the processing of:
generating a group for viewers of a video introducing a product to interact with each other on social media;
detecting a viewer who has viewed the video and purchased the product; and registering the detected viewer to the group.

A management method according to a second aspect of the present disclosure includes: by a computer,
generating a group for viewers of a video introducing a product to interact with each other on social media;
detecting a viewer who has viewed the video and purchased the product; and
registering the detected viewer to the group.

A recording medium according to a third aspect of the present disclosure stores a program for causing a computer to perform the processing of:
generating a group for viewers of a video introducing a product to interact with each other on social media;
detecting a viewer who has viewed the video and purchased the product; and registering the detected viewer to the group.

Advantageous Effects of Invention

According to the present disclosure, beneficial interaction among viewers is promoted.

BRIEF DESCRIPTION OF DRAWINGS

FIG. 4 is a schematic diagram illustrating an example of video management information;

FIG. 5 is a schematic diagram illustrating an example of viewer management information;

FIG. 6 is a schematic diagram illustrating an example of purchase history information;

FIG. 7 is a schematic diagram illustrating an example of group management information;

FIG. 18 is a flowchart for describing registration processing according to Embodiment 2.

DESCRIPTION OF EMBODIMENTS

Figure 1:
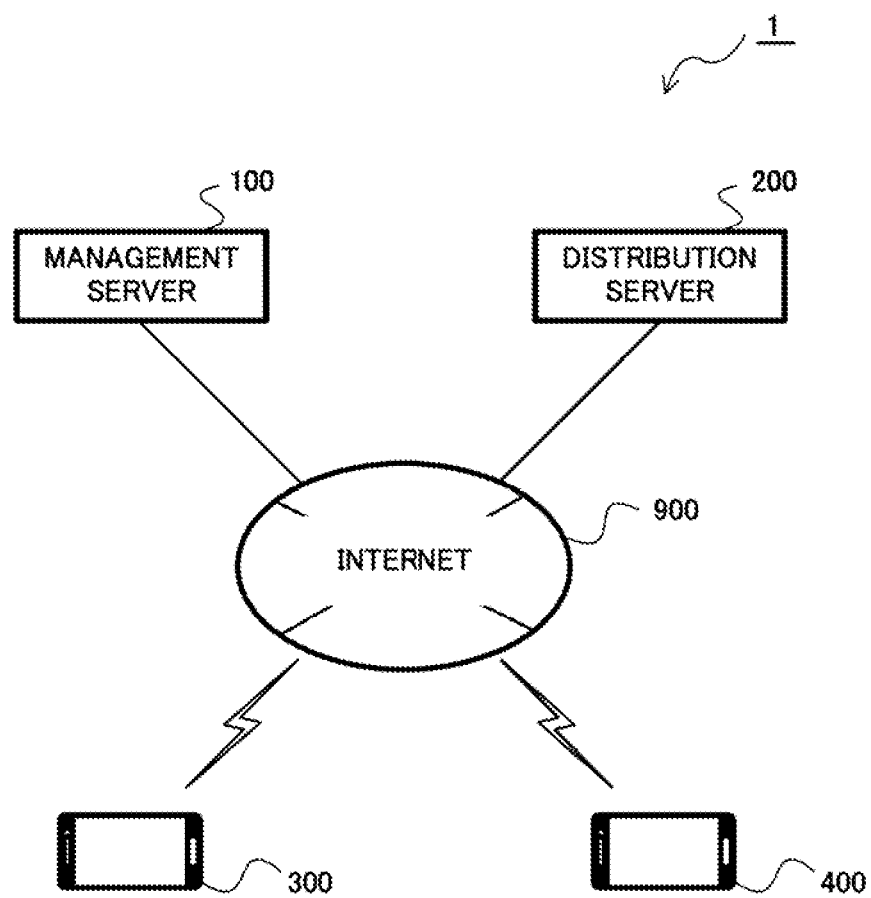
FIG. 1 is a schematic diagram illustrating an example of the overall configuration of a distribution system according to Embodiment 1 of the present disclosure.

The following describes the detailed embodiments of the present disclosure with reference to the drawings. Note that the same or corresponding elements in the drawings are designated by the same reference numerals. The following describes a case in which a management server (a server device) provides a messenger service to viewers and/or the like as an example of social media and generates a group (an ad hoc group chat described later) for viewers to interact with each other. However, the present disclosure may also be applied in a similar manner to providing various other services with a community function (such as, a social networking service (SNS) and a blog) to viewers and/or the like and generating a group. The management server may also use external social media to generate a group. The term "product" described below includes not only a physical product but also an electronic product (for example, electronic money, software such as a game sold as a download and the usage right, an electronic item, and/or the like). That is, the embodiments described below are for illustrative purposes only and do not limit the scope of the present disclosure. Accordingly, those skilled in the art can adopt embodiments in which each or all of these components are replaced by equivalents, and such embodiments are also included in the scope of this disclosure.

Embodiment 1

FIG. 1 is a schematic diagram illustrating an example of the overall configuration of a distribution system 1 according to Embodiment 1 of the present disclosure. The distribution system 1, as an example, includes a management server 100 for managing a viewer and the like, a distribution server 200 for distributing a video (a video that introduces a product), a streamer terminal 300 that is used by a streamer, and a viewer terminal 400 that is used by a viewer, all of which are communicatively connected via the Internet 900. Note that there are many streamer terminals 300 and viewer terminals 400 depending on the number of streamers and viewers using the system.

The management server 100 is, for example, a server device (a computer dedicated to a server) that manages a streamer who uses the streamer terminal 300 and a viewer who uses the viewer terminal 400 and provides a messenger service, as an example of social media, to the viewer and/or the like. Note that, in addition to the messenger service, the management server 100 may provide various services having a community function (for example, SNS, a blog, and the like) to a viewer and the like. The management server 100 may also use external social media.

The management server 100 can also exchange information with a predetermined sales server, not illustrated in the drawings, and stores purchase history information (information on a product purchased by a viewer at a predetermined electronic market) that is described later. The management server 100 registers a viewer who has purchased a product after viewing a video introducing the product to a group chat (an ad hoc group chat described below).

The distribution server 200 is, for example, a server device that manages distribution (for example, live streaming or recorded video distribution) provided by a streamer. In other words, the distribution server 200 receives a video (a video introducing a product) sent from the streamer terminal 300 and distributes the video to the viewer terminal 400.

The streamer terminal 300 is a terminal, such as a personal computer (PC), a smartphone, and a tablet, that is used by a streamer who provides distribution (for example, live streaming). As a specific example, the streamer distributes a video to introduce a product requested by an advertiser. In other words, the streamer is an example of an introducer who introduces a product. In addition, the advertiser is a provider of the product, for example, a manufacturer of the product, a store that sells the product (at an electronic market) (that may not be a manufacturer), and/or the like.

The viewer terminal 400 is, for example, a terminal such as a smartphone, a tablet, and a PC, that is used by a viewer who views a video distributed by a streamer. As a specific example, after logging into the distribution server 200 by operating the viewer terminal 400 or through other means, the viewer views a video (a live video or a recorded video) distributed by the streamer terminal 300 via the distribution server 200.

(Outline Configuration of the Information Processing Device 500)

The following describes a typical information processing device 500 that implements the management server 100, the distribution server 200, the streamer terminal 300, and the viewer terminal 400 according to Embodiment 1.

Figure 2:
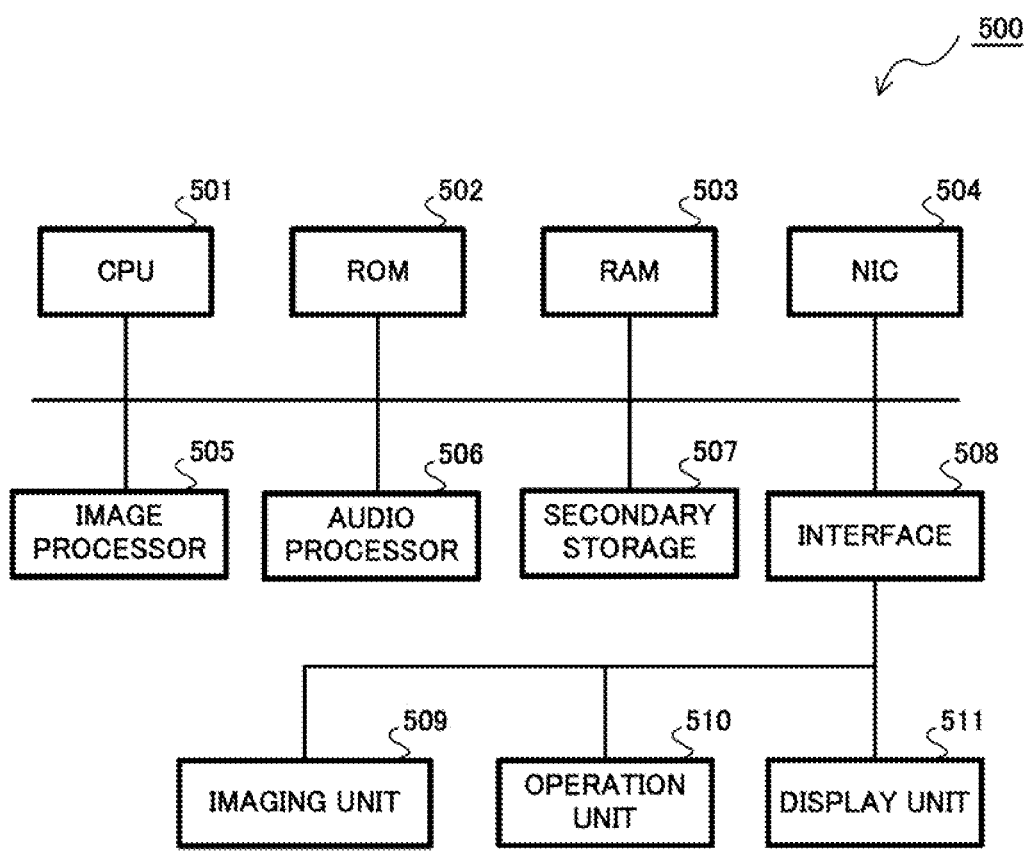
FIG. 2 is a block diagram illustrating an example of the outline configuration of a typical information processing device in which a management server and/or the like is realized.

As illustrated in FIG. 2, the information processing device 500 comprises a central processing unit (CPU) 501, a read-only memory (ROM) 502, a random-access memory (RAM) 503, a network interface card (NIC) 504, an image processor 505, an audio processor 506, a secondary storage 507, an interface 508, an imaging unit 509, an operation unit 510, and a display unit 511.

The CPU 501 controls the entire operation of the information processing device 500 and is connected to each component to exchange control signals and data.

The ROM 502 stores an initial program loader (IPL) executed immediately after power-on. When the IPL is executed, a program stored in the secondary storage 507 is read into the RAM 503 and the program is started by the CPU 501.

The RAM 503 is for temporarily storing data and a program and retains the program and data read from the secondary storage 507 and other data necessary for communications.

The NIC 504 is for connecting the information processing device 500 to a computer communication network such as the Internet, including: one that conforms to the 10BASE-T/100BASE-T standard that is used when constructing a local area network (LAN); an analog modem, an integrated services digital network (ISDN) modem, and an asymmetric digital subscriber line (ADSL) modem for connecting to the Internet using a telephone line; and a cable modem and/or the like for connecting to the Internet using a cable television line.

The image processor 505 processes image data that is read from the secondary storage 507 or the like by the CPU 501 and the image computing processor (not illustrated) equipped in the image processor 505 and then stores the processed image in a frame memory (not illustrated) equipped in the image processor 505. The image information that is recorded in the frame memory is converted into a video signal at a predetermined synchronization timing and output to the display unit 511 via the interface 508 or the like. That is, the image processor 505 generates an image necessary for the progress of the processing performed by the information processing device 500 under the control of the CPU 501 and causes the display unit 511 to display the image.

The audio processor 506 converts music data and audio data read from the secondary storage 507 or the like to an audio signal and outputs the audio signal to outside via the interface 508 or the like. Note that, when the information processing device 500 incorporates a speaker, the audio processor 506 outputs the converted audio signal to the speaker. That is, the audio processor 506 generates a music sound or audio to be played in the progress of the processing performed by the information processing device 500 under the control of the CPU 501 and outputs the music sound or the like from an internal or external speaker.

The secondary storage 507 is a hard disk, a solid-state drive (SSD), or the like that stores various programs and various data necessary for controlling the entire operation of the information processing device 500. For example, the secondary storage 507 stores a program for implementing the management server 100 and/or the like according to the embodiments. Then, under the control of the CPU 501, the secondary storage 507 reads the stored program and data as necessary and causes the RAM 503 or the like to temporarily store the program and data.

The interface 508 conforms to standards such as HDMI (registered trademark), universal serial bus (USB), inter-integrated circuit (I2C) or the like, to which is connected the imaging unit 509, the operation unit 510, and the display unit 511. Note that the interface 508 may also transmit and receive necessary information to and from an external device that is connected to the interface 508.

The imaging unit 509 includes, for example, a single focal length lens and an image sensor with a predetermined number of pixels (complementary metal-oxide semiconductor (CMOS) or charge-coupled device (CCD)) that takes still images or videos.

The operation unit 510 receives an operation input by an operator or the like who uses the information processing device 500.

The display unit 511 draws an image according to the image data that is output by the image processor 505 and presents the image to an operator or the like using the information processing device 500.

In addition, the information processing device 500 may comprise a drive unit for a digital versatile disc (DVD)-ROM or the like, instead of the secondary storage 507. In such a case, the information processing device 500 reads a program and data from the DVD-ROM or the like mounted on the drive unit and operates the program and data in a similar manner to described above.

The following describes the functions and the like of the management server 100, the distribution server 200, the streamer terminal 300, and the viewer terminal 400 realized in the information processing device 500 described above with reference to FIGS. 3 to 12. When the power is turned on to the information processing device 500, the program that causes the functions of the management server 100, the distribution server 200, the streamer terminal 300, and the viewer terminal 400 according to Embodiment 1 is executed, realizing the management server 100, the distribution server 200, the streamer terminal 300, and the viewer terminal 400 according to Embodiment 1.

(Functional Configuration of the Management Server 100)

Figure 3:
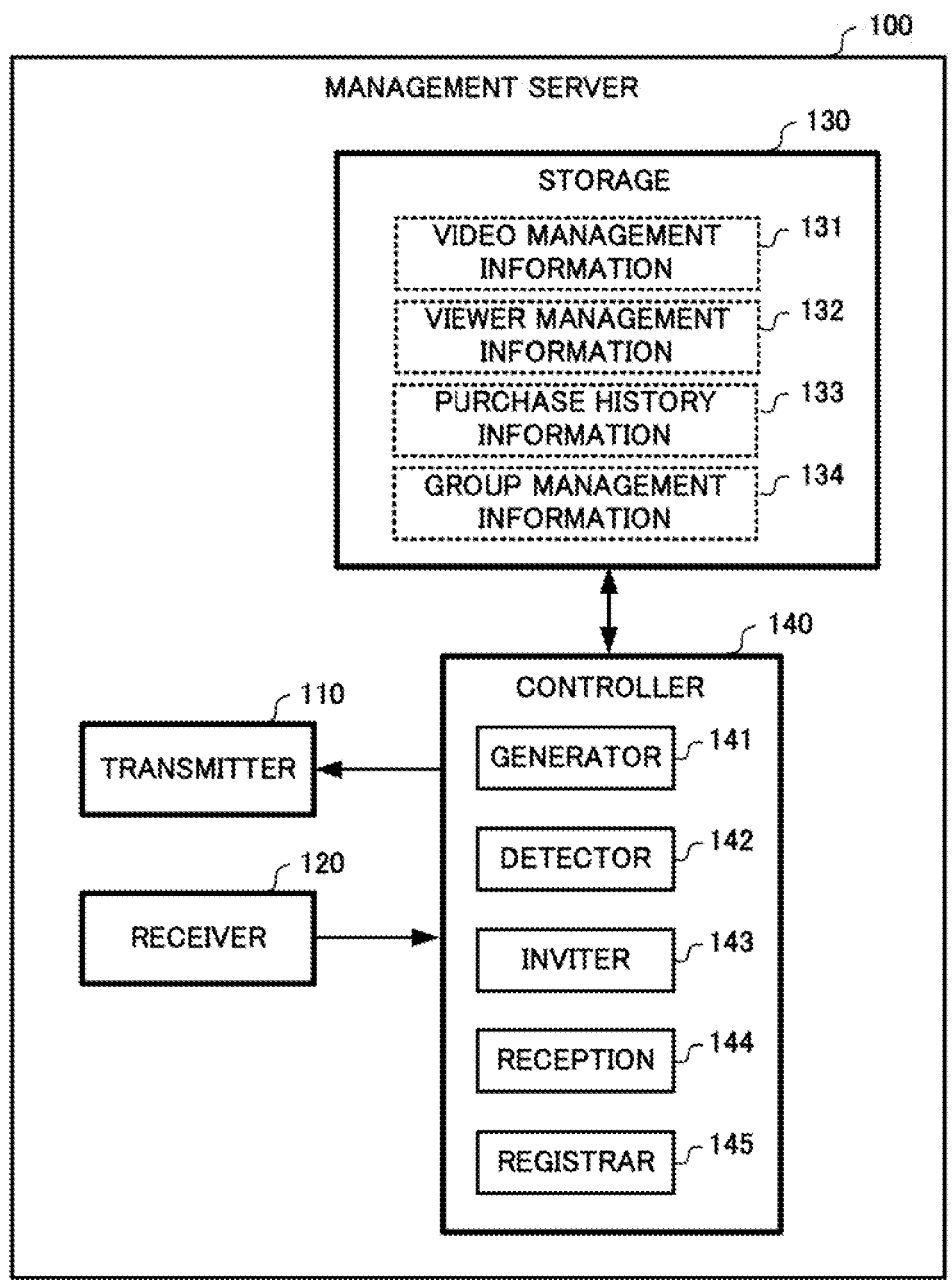
FIG. 3 is a block diagram illustrating an example of the functional configuration of the management server according to Embodiment 1.

FIG. 3 is a block diagram illustrating an example of the functional configuration of the management server 100 according to Embodiment 1. As illustrated, the management server 100 comprises a transmitter 110, a receiver 120, a storage 130, and a controller 140.

The transmitter 110 transmits various information to the viewer terminal 400 or the like via the Internet 900. For example, the transmitter 110 is controlled by the controller 140 (an inviter 143 described later), and an invitation message for inviting a viewer to a group chat (an ad hoc group chat described later) is transmitted to the viewer terminal 400. Note that the NIC 504 described above may function as such a transmitter 110.

The receiver 120 receives various information transmitted from the viewer terminal 400 or the like via the Internet 900. For example, the receiver 120 receives a response (response information indicating acceptance or rejection) that is replied from the viewer terminal 400 to which the invitation message was sent. Note that the above-described NIC 504 may function as such a receiver 120.

The storage 130 stores various information necessary for processing in the management server 100. For example, the storage 130 stores video management information 131, viewer management information 132, purchase history information 133, and group management information 134.

The video management information 131 is information for managing a video that is distributable from the distribution server 200 and includes, as an example, the information as illustrated in FIG. 4. In other words, the video management information 131 includes information such as a video ID 131a, a product ID 131b, a product name 131c, a streamer ID 131d, and a group ID 131e. Note that the product ID 131b is information for identifying a product introduced in a video indicated by the video ID 131a. In addition, the product name 131c is a product name, a model number, or the like of a product introduced in the video. In addition, the streamer ID 131d is the identity information of a streamer who distributes the video. Then, the group ID 131e is information for identifying a group chat generated by the controller 140 (a generator 141 described later). In other words, a distributed video is associated with a group chat.

Referring back to FIG. 3, the viewer management information 132 is information for managing a viewer who uses the viewer terminal 400 and includes, as an example, information as illustrated in FIG. 5. In other words, the viewer management information 132 includes information such as a viewer ID 132a, a name 132b, an address 132c, a viewed video ID 132d, and a viewed date and time 132e. Note that the viewed video ID 132d is information for identifying a video viewed by the viewer indicated by the viewer ID 132a. The viewed date and time 132e is date and time at which the viewer viewed the video indicated by the viewed video ID 132d.

Referring back to FIG. 3, the purchase history information 133 is information about a product purchased by a viewer at a predetermined electronic marketplace (including a product purchased independently of viewing a video) and includes, as an example, information as illustrated in FIG. 6. In other words, the purchase history information 133 includes information such as a viewer ID 133a, a purchased product ID 133b, a purchased product name 133c, purchase date and time 133d, a purchased price 133e, and the like.

Referring back to FIG. 3, the group management information 134 is information for managing a group chat generated by the controller 140 (the generator 141 described later) and includes, as an example, information as illustrated in FIG. 7. That is, the group management information 134 includes information such as a group ID 134a, a user ID 134b, a state 134c and the like. Note that the user ID 134b is information for identifying a viewer or a streamer belonging to a group indicated by the group ID 134*a*. In addition, the state 134*c* indicates the current state of a viewer or the like indicated by the user ID 134*b*.

The storage 130 also stores various other information necessary for processing in the controller 140. For example, the storage 130 also stores information about a streamer or an advertiser (the provider of a product). Note that the secondary storage 507 or the like described above may function as such a storage 130.

Referring back to FIG. 3, the controller 140 controls the entire management server 100. The controller 140 includes, for example, a generator 141, a detector 142, an inviter 143, a reception 144, and a registrar 145.

The generator 141 generates an ad hoc group chat that is a group for viewers of a video introducing a product to interact with each other on social media. For example, when a video introducing a product (a new video) becomes distributable from the distribution server 200, the generator 141 generates an ad hoc group chat that is associated with the video. In other words, the generator 141 generates an ad hoc group chat with a new group ID 134*a* in the group management information 134 of FIG. 7 described above. Note that, for example, only a streamer who distributes a video is registered to an ad hoc group chat at an initial stage, and a viewer who satisfies conditions is sequentially registered by the registrar 145 that is described later. In addition, the generator 141 adds the identification information of the generated ad hoc group chat to the group ID 131*e* of the corresponding video in the video management information 131 of FIG. 4 described above.

The detector 142 detects a viewer who purchased a product introduced in a video after viewing the video. For example, for each viewer, the detector 142 determines whether the product introduced in the video indicated by the viewed video ID 132*d* (the product indicated by the product ID 131*b* corresponding to the same video ID 131*a* in the video management information 131 of FIG. 4 described above) has been purchased by the corresponding viewer in the above-described purchase history information 133 of FIG. 6 within a certain period of time (for example, within one week) from the viewed date and time 132*e* in the above-described viewer management information 132 of FIG. 5. Once the viewer who satisfies the conditions has been identified, the detector 142 then notifies the inviter 143 of the information of the viewer.

Figure 8:
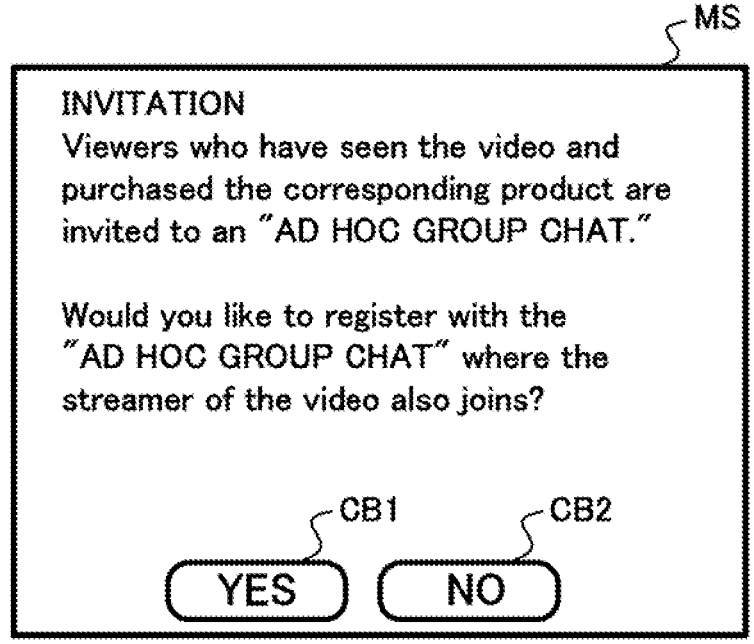
FIG. 8 is a schematic diagram illustrating an example of an invitation message.

The inviter 143 invites the viewer detected by the above-described detector 142 to the ad hoc group chat generated by the above generator 141 (the ad hoc group chat corresponding to the video viewed by the viewer). For example, the inviter 143 generates an invitation message MS as illustrated in FIG. 8 and sends the invitation message MS to the viewer terminal 400 used by the viewer detected by the detector 142. This invitation message MS includes an accept button CB1 for accepting the invitation and a reject button CB2 for rejecting the invitation. Note that these accept button CB1 and reject button CB2 are, for example, associated with information for identifying an ad hoc group chat and a viewer and, when pressed by the viewer, response information including information for identifying the ad hoc group chat and the viewer is returned to the management server 100.

Referring back to FIG. 3, the reception 144 accepts a response to the invitation from the viewer invited by the inviter 143 described above. For example, the reception 144 accepts response information indicating acceptance when the accept button CB1 is pressed on the viewer terminal 400 to which the above-described invitation message MS illustrated in FIG. 8 has been sent. Whereas, when the reject button CB2 is pressed, the reception 144 accepts response information indicating rejection.

When the above-described reception 144 receives a response indicating acceptance, the registrar 145 registers the corresponding viewer to the ad hoc group chat generated by the above-described generator 141 (the ad hoc group chat corresponding to the video viewed by the viewer). In other words, the registrar 145 adds the identification information of the viewer who has replied a response indicating acceptance to the user ID 134*b* of the corresponding group ID 134*a* in the above-described group management information 134 of FIG. 7. At that time, the registrar 145 sets "registered" to the corresponding state 134*c*.

The above-described CPU 501 or the like may function as a controller 140 of such a configuration.

(Functional Configuration of the Distribution Server 200)

Figure 9:
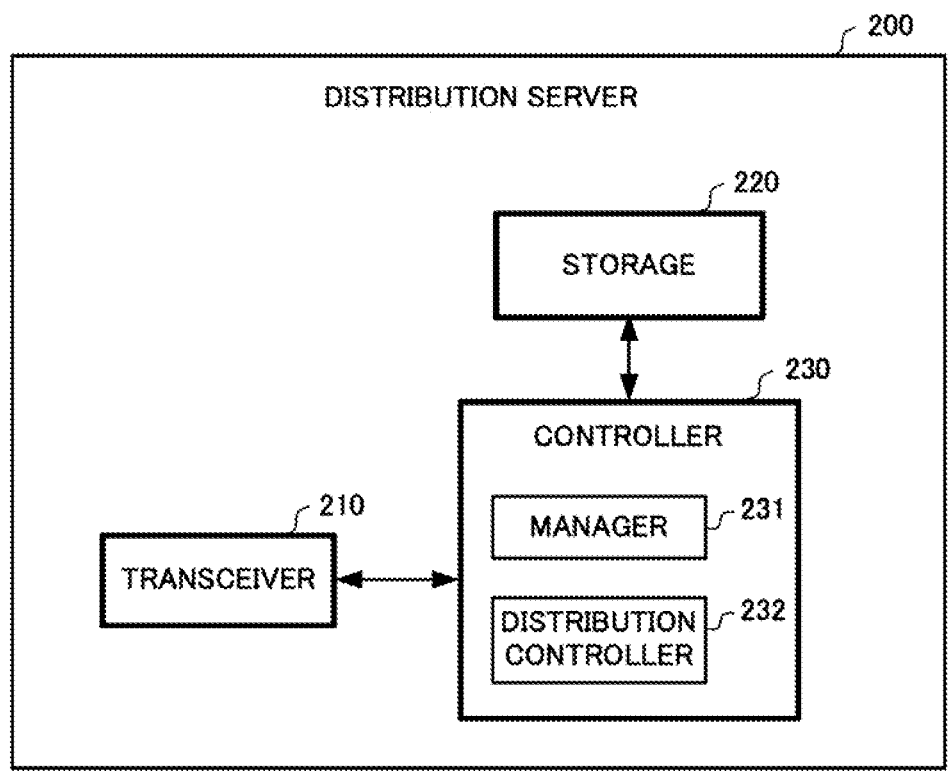
FIG. 9 is a block diagram illustrating an example of the functional configuration of a distribution server.

FIG. 9 is a block diagram illustrating an example of the functional configuration of the distribution server 200. As illustrated, the distribution server 200 comprises a transceiver 210, a storage 220, and a controller 230.

The transceiver 210 transmits and receives various information to and from the streamer terminal 300 and the viewer terminal 400 via the Internet 900. For example, the transceiver 210 receives a video (for example, a live video or a recorded video) transmitted from the streamer terminal 300 and distributes the received video to the viewer terminal 400. Note that the NIC 504 described above may function as such a transceiver 210.

The storage 220 stores various information necessary for processing in the distribution server 200. For example, the storage 220 stores the ID, password, and the like of the viewer who uses the viewer terminal 400. Note that the secondary storage 507 or the like described above may function as such a storage 220.

The controller 230 controls the entire distribution server 200. The controller 230 includes, for example, a manager 231 and a distribution controller 232.

The manager 231 authenticates a viewer by verifying, for example, the ID, password and/or the like sent from the viewer terminal 400, who is requesting login, with an ID, a password and/or the like stored in the storage unit 220.

The distribution controller 232 controls the transceiver 210 and distributes the video received from the streamer terminal 300 to the viewer terminal 400.

The above-described CPU 501 or the like may function as a controller 230 of such a configuration.

(Functional Configuration of the Streamer Terminal 300)

Figure 10:
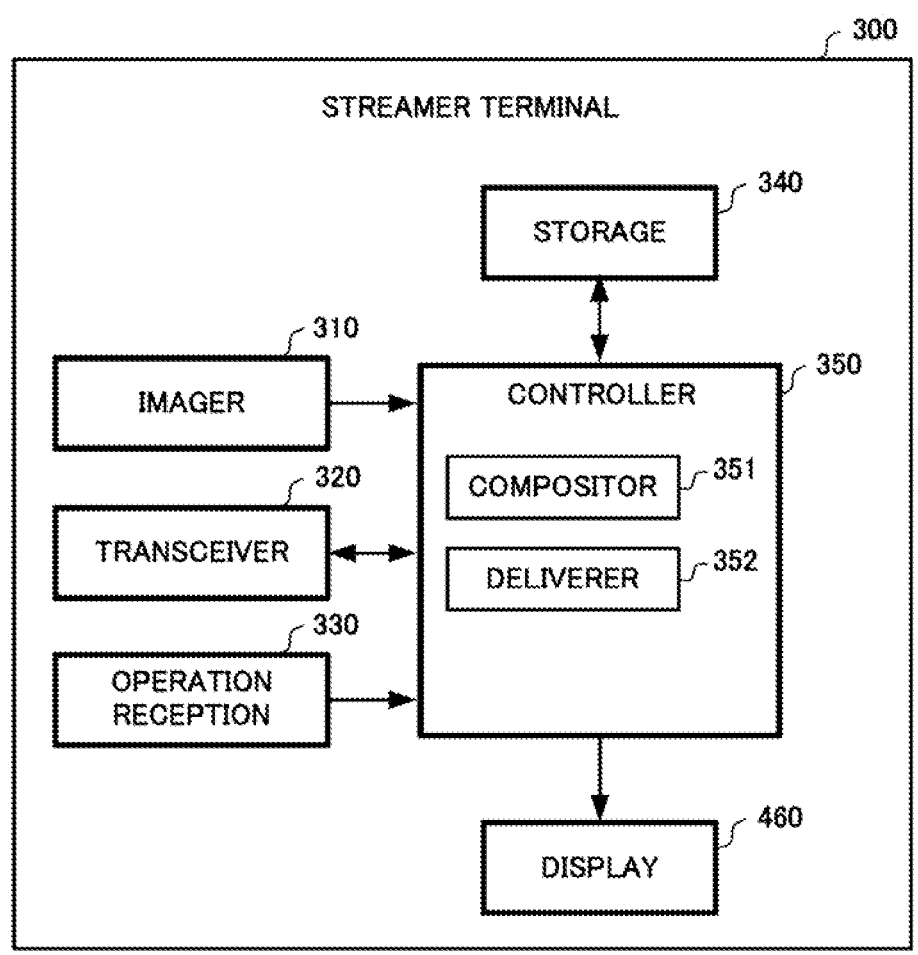
FIG. 10 is a block diagram illustrating an example of the functional configuration of a streamer terminal.

FIG. 10 is a block diagram illustrating an example of the functional configuration of the streamer terminal 300. As illustrated, the streamer terminal 300 includes an imager 310, a transceiver 320, an operation reception 330, a storage 340, a controller 350, and a display 360.

The imager 310 is, for example, a camera arranged in the streamer terminal 300 and films the streamer and the like during distribution. That is, the imager 310 outputs a video (for example, a live video) including the streamer during distribution. Note that the above-described imaging unit 509 can function as such an imager 310.

The transceiver 320 transmits and receives various information to and from the distribution server 200 via the Internet 900. For example, the transceiver 320 is controlled by the controller 350 (a deliverer 352 described later), and transmits to the distribution server 200 a video obtained by compositing an object with the video filmed by the imager 310 (distributes to the viewer terminal 400 via the distribution server 200). Note that the above-described NIC 504 may function as such a transceiver 320.

The operation reception 330 is a touch panel or a pointing device that accepts various operations from a streamer. For example, the operation reception 330 accepts an operation directed to an object to be composited into a video filmed by the imager 310. Note that the above-described operation unit 510 may function as such an operation reception 330.

The storage 340 stores various information necessary for processing in the streamer terminal 300. For example, the storage 340 stores information about an object to be composited into the filmed video, the composition position of the object, and/or the like. For example, an object is a caption (a banner) that includes text information to notify a viewer in a live stream. The composition position is a position at which an object is composited into the video. Note that the above-described secondary storage 507 or the like may function as such a storage 340.

The controller 350 controls the entire streamer terminal 300. The controller 350 includes, for example, a compositor 351 and a deliverer 352.

The compositor 351 composites an object into a video that was filmed by the imager 310. For example, the compositor 351 composites character information for notifying a viewer into the filmed image according to the information and composition position of the object stored in the storage 340.

The deliverer 352 transmits the video that was composited with the object by the compositor 351 to the distribution server 200 for distributing the video to the viewer terminal 400. That is, the deliverer 352 controls the transceiver 320 to transmit the video that was composited with the object to the distribution server 200 and distribute the video to the viewer terminal 400 via the distribution server 200.

Note that the above-described CPU 501 or the like may function as a controller 350 of such a configuration.

The display 360 displays the video that was composited with the object by the above-described compositor 351. Note that the above-described display unit 511 may function as such a display 360.

(Functional Configuration of the Viewer Terminal 400)

Figure 11:
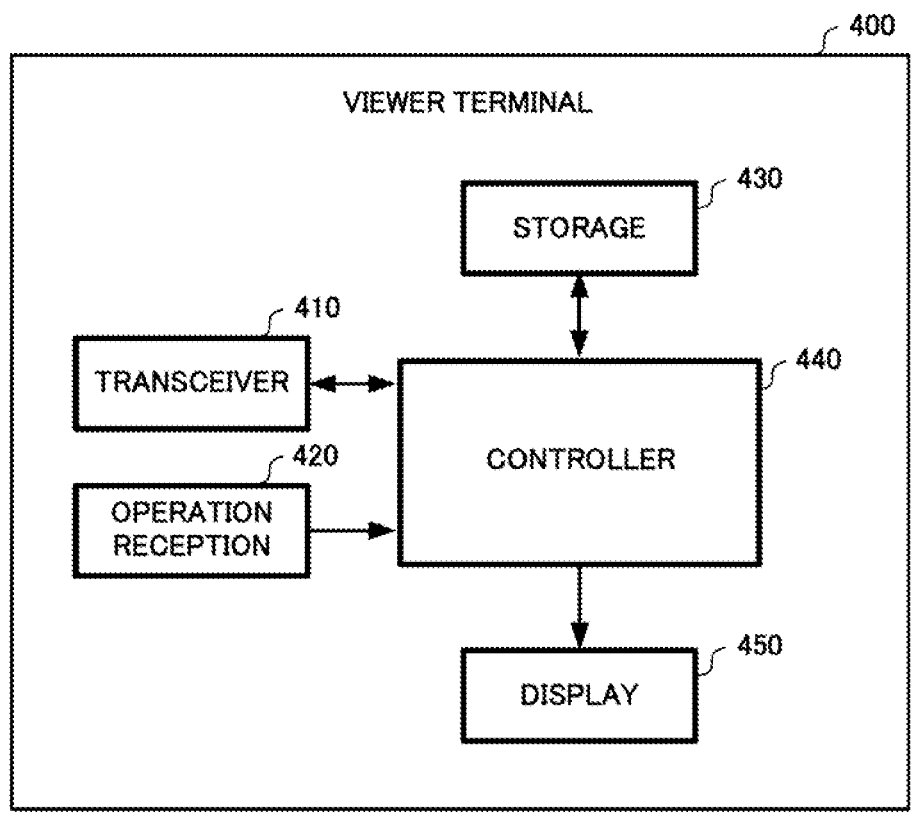
FIG. 11 is a block diagram illustrating an example of the functional configuration of a viewer terminal.

FIG. 11 is a block diagram illustrating an example of the functional configuration of the viewer terminal 400. As illustrated, the viewer terminal 400 comprises a transceiver 410, an operation reception 420, a storage 430, a controller 440, and a display 450.

The transceiver 410 transmits and receives various information to and from the management server 100 and the distribution server 200 via the Internet 900. For example, the transceiver 410 receives a video distributed from the distribution server 200 under the control of the controller 440. Further, the transceiver 410 receives an invitation message MS as illustrated in FIG. 8 described above sent from the management server 100. Then, when the accept button CB1 or the reject button CB2 is pressed by the viewer while the invitation message MS is displayed on the display 450 as described later, the transceiver 410 transmits response information to the management server 100. Note that the NIC 504 described above may function as such a transceiver 410.

The operation reception 420 is a touch panel or a pointing device that accepts various operations from a viewer. For example, the operation reception 420 accepts an operation directed to the accept button CB1 or the reject button CB2 while an invitation message MS as illustrated in FIG. 8 is displayed on the display 450. Note that the operation unit 510 described above may function as such an operation reception 420.

The storage 430 stores various information necessary for processing in the viewer terminal 400. For example, the storage 430 stores various applications including a video playback application and a messenger application. More specifically, various applications are installed in the storage 430. Note that the video playback application is, for example, an application for reproducing a video distributed from the distribution server 200. Further, the messenger application is, for example, an application for using a messenger service provided by the management server 100. Note that the above-described secondary storage 507 or the like may function as such a storage 430.

The controller 440 controls the entire viewer terminal 400. For example, the controller 440 plays a video distributed from the distribution server 200 by executing a video playback application stored in the storage 430 and causes the display 450 to display the video. Further, the controller 440 executes a messenger application stored in the storage 430 and causes the display 450 to display various messages sent from the management server 100. Note that the above-described CPU 501 or the like may function as a controller 440 of such a configuration.

Figure 12:
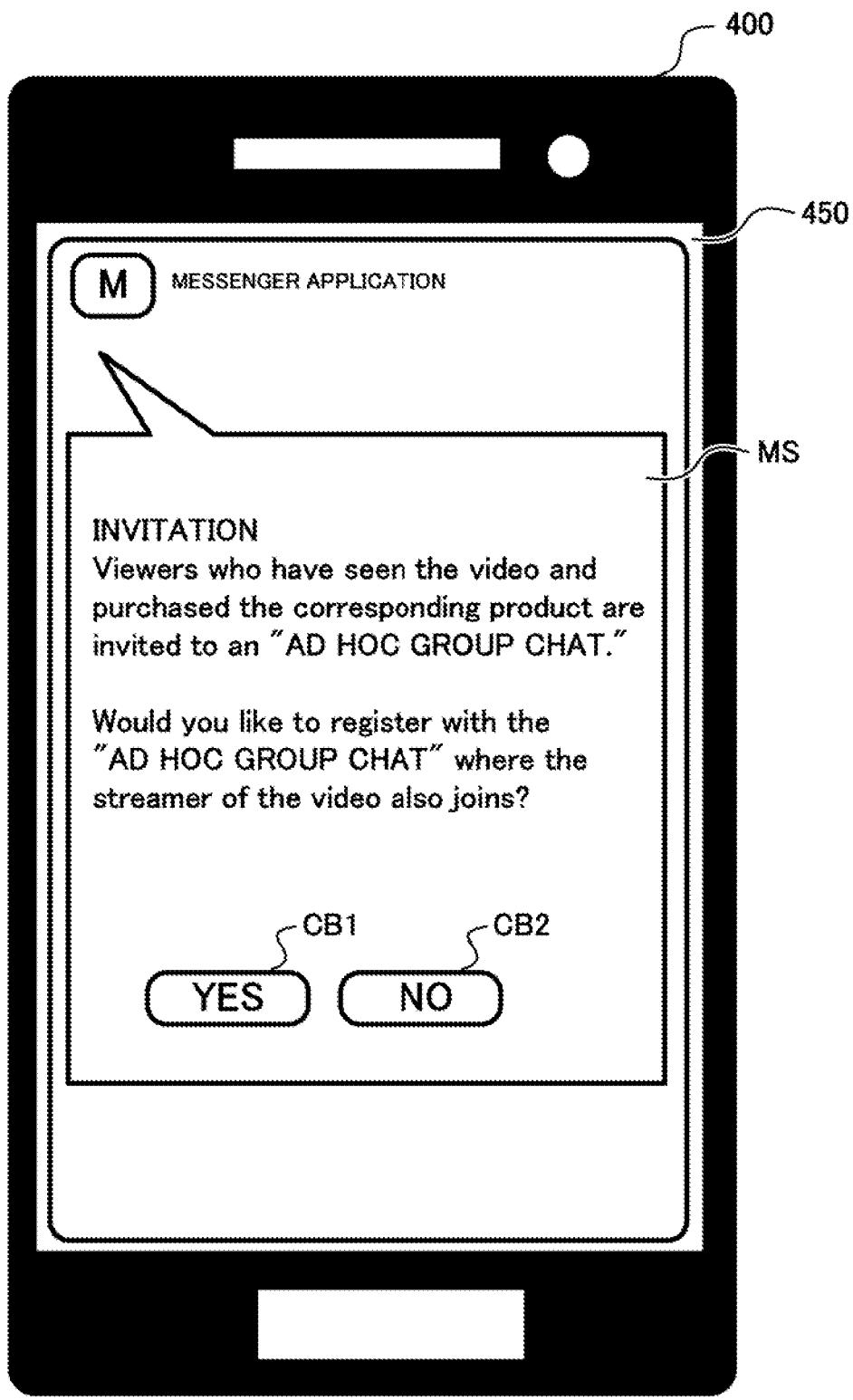
FIG. 12 is a schematic diagram illustrating an example of an invitation message displayed on the display of a viewer terminal.

The display 450 displays a screen and various messages according to the application executed by the controller 440. For example, when the transceiver 410 receives an invitation message MS sent from the management server 100, the display 450 displays the invitation message MS as illustrated in FIG. 12. The invitation message MS includes an accept button CB1 and a reject button CB2 as described above. Note that the above-described display unit 511 may function as such a display 450.

(Operation of the Management Server 100)

Figure 13:
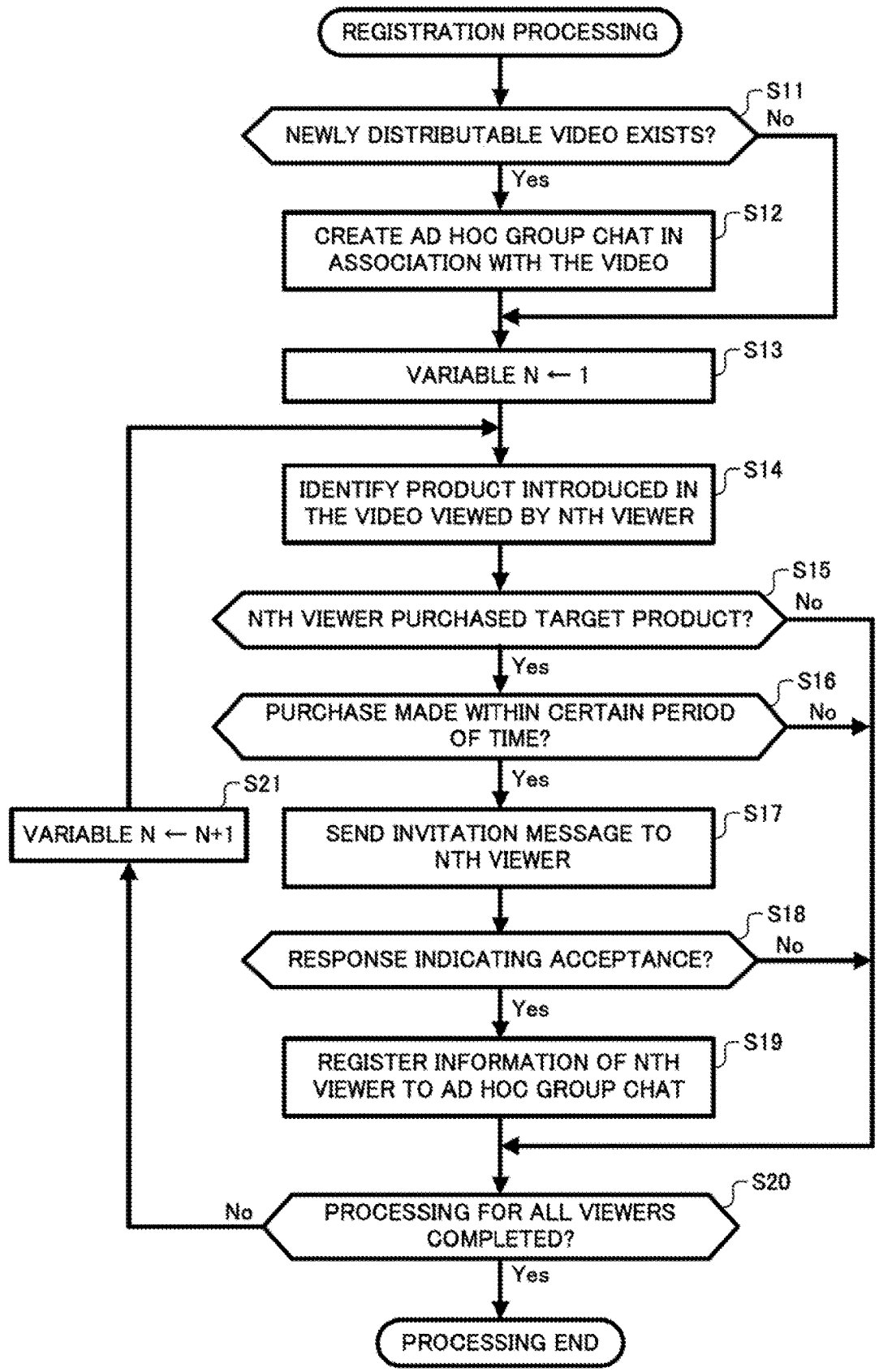
FIG. 13 is a flowchart for describing registration processing according to Embodiment 1.

The following describes the operation of the management server 100 with reference to FIG. 13. FIG. 13 is a flowchart for describing the registration processing according to Embodiment 1. This registration processing is executed repeatedly, for example, at regular intervals.

First, the management server 100 determines whether or not there is a newly distributable video (step S11). For example, the controller 140 controls the transmitter 110 to access the distribution server 200 and determines whether there is a newly distributable video.

When the management server 100 determines that there is no newly distributable video (step S11; No), the management server 100 proceeds with processing at step S13 described later.

On the other hand, when the management server 100 determines that there is a newly distributable video (step S11; Yes), the management server 100 creates an ad hoc group chat in association with the video (step S12). For example, the controller 140 (the generator 141) generates an ad hoc group chat associated with the new video. In other words, the controller 140 generates an ad hoc group chat with a new group ID 134a in the above-described group management information 134 of FIG. 7. Note that, for example, only a streamer who distributes a video is registered to an ad hoc group chat at an initial stage. The controller 140 adds new video information to the above-described video management information 131 of FIG. 4.

The management server 100 sets 1 as an initial value to a variable N (step S13). This variable N is, for example, information for referring to viewers in sequence in the above-described viewer management information 132 of FIG. 5.

The management server 100 identifies the product that was introduced in the video that the Nth viewer has viewed (step S14). For example, the controller 140 (the detector 142) searches the video management information 131 of FIG. 4 described above using the viewed video ID 132d viewed by the Nth viewer in the viewer management information 132 of FIG. 5 described above as a key and identifies the product represented by the product ID 131b corresponding to the same video ID 131a.

The management server 100 determines whether or not the Nth viewer has purchased the target product (step S15). For example, the controller 140 (the detector 142) searches the purchase history information 133 of FIG. 6 described above using the viewer ID 132a of the Nth viewer in the viewer management information 132 of FIG. 5 described above as a key and determines whether the purchased product ID 133b corresponding to the same viewer ID 133a includes the product identified at step S14 above.

When the management server 100 determines that the Nth viewer has not purchased the target product (step S15; No), the management server 100 proceeds with processing at step S20 described later.

On the other hand, when the management server 100 determines that the Nth viewer has purchased the target product (step S15; Yes), the management server 100 determines whether or not the purchase was made within a certain period of time after viewing (step S16). For example, the controller 140 (the detector 142) determines whether the purchase date and time 133d of the target product in the purchase history information 133 of FIG. 6 described above is within a certain period of time from the viewed date and time 132e of the Nth viewer in the viewer management information 132 of FIG. 5 described above (viewed date and time 132e corresponding to the viewed video ID 132d that introduces the target product).

When the management server 100 determines that the purchase was not made within a certain period of time after viewing (step S16; No), the management server 100 proceeds with processing at step S20 described later.

On the other hand, when the management server 100 determines that the purchase was made within a certain period of time after viewing (step S16; Yes), the management server 100 transmits an invitation message to the Nth viewer (Step S17). For example, the controller 140 (the inviter 143) generates an invitation message MS as illustrated in FIG. 8 described above and transmits the invitation message MS to the viewer terminal 400 used by the Nth viewer. The viewer terminal 400 that has received the invitation message MS displays the received invitation message MS on the display 450 as illustrated in FIG. 12 described above. Then, the viewer presses the accept button CB1 or the reject button CB2.

The management server 100 determines whether or not there is a response indicating acceptance (step S18). For example, the controller 140 (the reception 144) determines that there is a response indicating acceptance when the accept button CB1 is pressed on the viewer terminal 400 illustrated in FIG. 12 described above. Whereas, the controller 140 determines that there is no response indicating acceptance when the reject button CB2 is pressed (or when there is no operation) on the viewer terminal 400 illustrated in FIG. 12.

When the management server 100 determines that there is no response indicating acceptance (step S18; No), the management server 100 proceeds with processing at step S20 described later.

On the other hand, when the management server 100 determines that there is a response indicating acceptance (step S18; Yes), the management server 100 registers the information of the Nth viewer to an ad hoc group chat (step S19). For example, the controller 140 (the registrar 145) adds identification information of the Nth viewer to the user ID 134b of the corresponding group ID 134a in the group management information 134 of FIG. 7 described above. At that time, the controller 140 sets "registered" to the corresponding state 134c.

The management server 100 determines whether or not processing for all viewers has been completed (step S20).

When the management server 100 determines that processing for all viewers has not been completed (step S20; No), the management server 100 adds 1 to the variable N (step S21). Then, the management server 100 returns the processing to step S14 described above.

On the other hand, when the management server 100 determines that the processing for all viewers has been completed (step S20; Yes), the management server 100 ends the registration processing.

Note that, the above-described registration processing of FIG. 13 has been described as a case in which a response from the viewer can be obtained at step S18 immediately after sending the invitation message at step S17, but in fact, the response from the viewer may be obtained with a certain delay. As described above, since the response information sent from the viewer terminal 400 also includes information for identifying an ad hoc group chat and a viewer, the presence or absence of a delayed response indicating acceptance is also determined at step S18, and the target viewer may be registered to the target ad hoc group chat according to the identification information contained in the response information at step S19.

Through such registration processing, a viewer who has viewed the video and purchased the product introduced in the video is registered to an ad hoc group chat in association with the video. Therefore, in the ad hoc group chat, the viewers who actually purchased the product introduced in the video exchange candid opinions about the product by chatting. As a result, beneficial interaction among the viewers can be promoted. In addition, the streamer can also listen to viewers' opinions on the video, which can be expected to be put in use in a future distribution.

Embodiment 2

Although the above Embodiment 1 describes a case where a viewer who has purchased a product introduced in a video after viewing the video is registered to an ad hoc group chat, a viewer who purchased a product without viewing the video introducing the product, then later, viewed the video introducing the product may also be registered to an ad hoc group chat. The following describes a distribution system characterized in that a viewer who has purchased a product without viewing a video introducing a product is guided to the video, and the viewer who viewed the video in response to the guidance is also registered to an ad hoc group chat.

Figure 14:
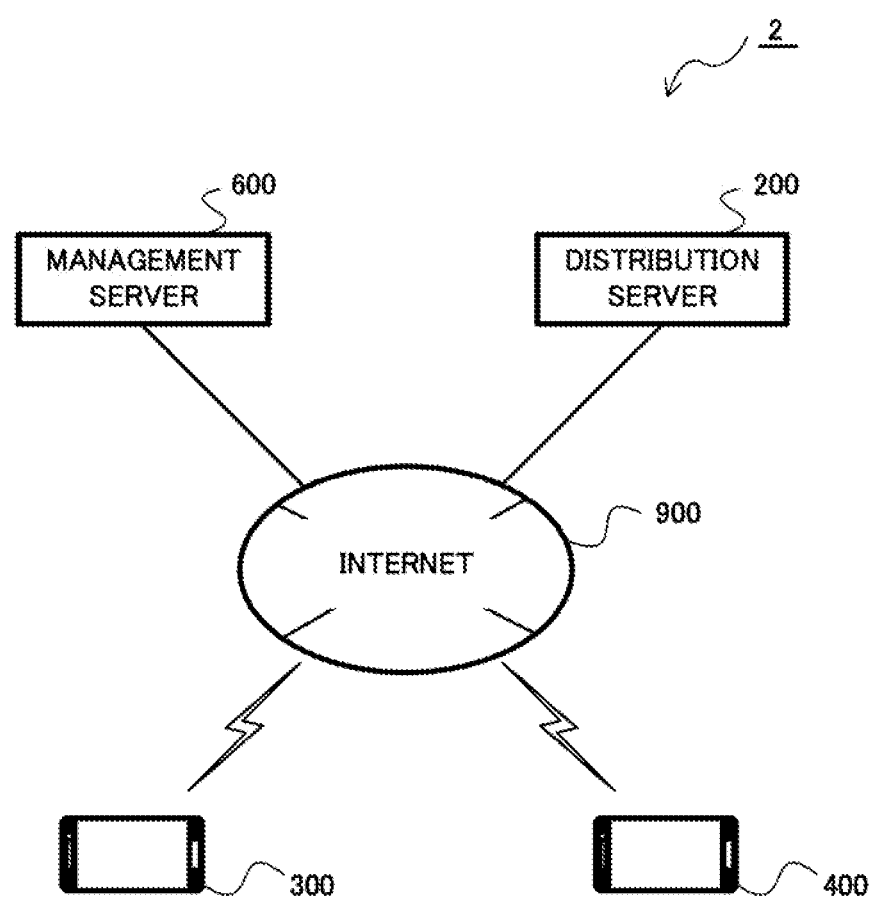
FIG. 14 is a schematic diagram illustrating an example of the overall configuration of a distribution system according to Embodiment 2 of the present disclosure.

FIG. 14 is a schematic diagram illustrating an example of the overall configuration of a distribution system 2 according to Embodiment 2 of the present disclosure. As an example, the distribution system 2 includes a management server 600 for managing a viewer and the like, a distribution server 200 for distributing a video, a streamer terminal 300 that is used by a streamer, and a viewer terminal 400 that is used by a viewer, all of which are communicatively connected via the Internet 900. Note that the distribution server 200, the streamer terminal 300, and the viewer terminal 400 have the same configurations as the distribution server 200, the streamer terminal 300, and the viewer terminal 400 of the distribution system 1 according to the above-described Embodiment 1. In other words, only the management server 600 is different from the distribution system 1 of FIG. 1.

The management server 600 is also realized by the above-described information processing device 500 of FIG. 2. That is, when power is turned on to the information processing device 500, a program that causes the information processing device 500 to function as the management server 600 according to Embodiment 2 is executed, realizing the management server 600 according to Embodiment 2.

(Functional Configuration of the Management Server 600)

Figure 15:
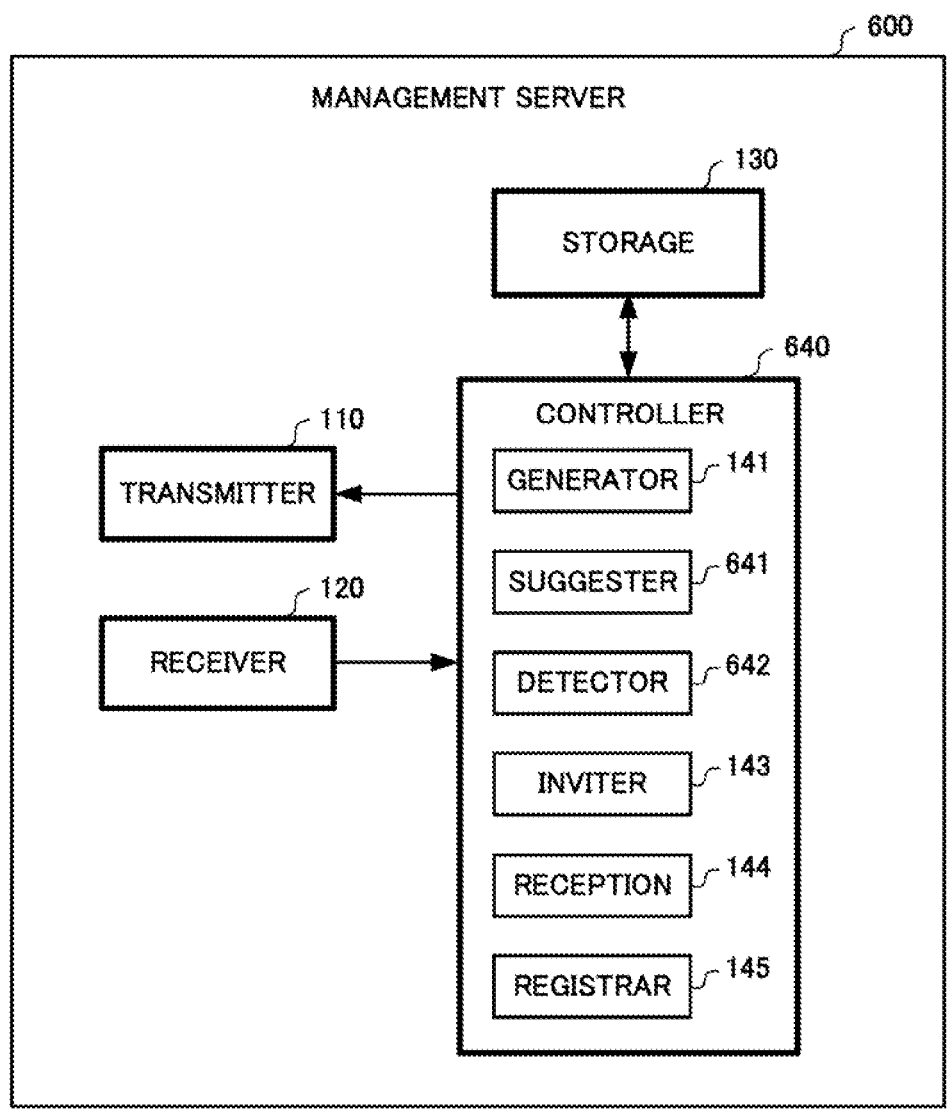
FIG. 15 is a block diagram illustrating an example of the functional configuration of a management server according to Embodiment 2.

FIG. 15 is a block diagram illustrating an example of the functional configuration of the management server 600 according to Embodiment 2. As illustrated, the management server 600 comprises a transmitter 110, a receiver 120, a storage 130, and a controller 640. Note that the transmitter 110, the receiver 120, and the storage 130 have the same configurations as the transmitter 110, the receiver 120, and the storage 130 of the above-described management server 100 in FIG. 3.

The controller 640 controls the entire management server 600. The controller 640 includes, for example, a generator 141, a suggester 641, a detector 642, an inviter 143, a reception 144, and a registrar 145. Note that the generator 141, the inviter 143, the reception 144, and the registrar 145 have the same configurations as the generator 141, the inviter 143, the reception 144, and the registrar 145 of the above-described management server 100 (the controller 140) in FIG. 3.

Figure 16:
FIG. 16 is a schematic diagram illustrating an example of a suggestion message.

The suggester 641 suggests a video that introduces a product to a viewer who purchased the product without viewing the video. For example, if there is a video introducing the product indicated by the purchased product ID 133*b* in the purchase history information 133 of FIG. 6 described above (distributable from the distribution server 200) and the video has not been viewed by the viewer, the suggester 641 generates a suggestion message IM as illustrated in FIG. 16 and transmits the suggestion message IM to the viewer terminal 400 of the viewer who purchased the product without viewing the video. The suggestion message IM includes a banner BN through which the viewer can view the video introducing the product. Note that, for example, this banner BN is associated with information for identifying a viewer in addition to the identification information of the video, and, when the banner BN is pressed by the viewer, the necessary information is passed to the management server 600 before redirected to the distribution server 200.

Referring back to FIG. 15, the detector 642 detects a viewer who has viewed a video introducing a product and purchased the product introduced in the video. In other words, the detector 642 detects not only the viewer who has viewed the video and purchased the product introduced in the video but also the viewer who has viewed the video introducing the product after purchasing the product without watching the video. For example, when a video that was suggested to a viewer by the above-described suggestion message IM as illustrated in FIG. 16 is viewed by pressing the banner BN, the detector 642 detects the viewer as a viewer who has purchased the product without viewing the video introducing the product and viewed the video later on.

(Operation of the Management Server 600)

Figure 17:
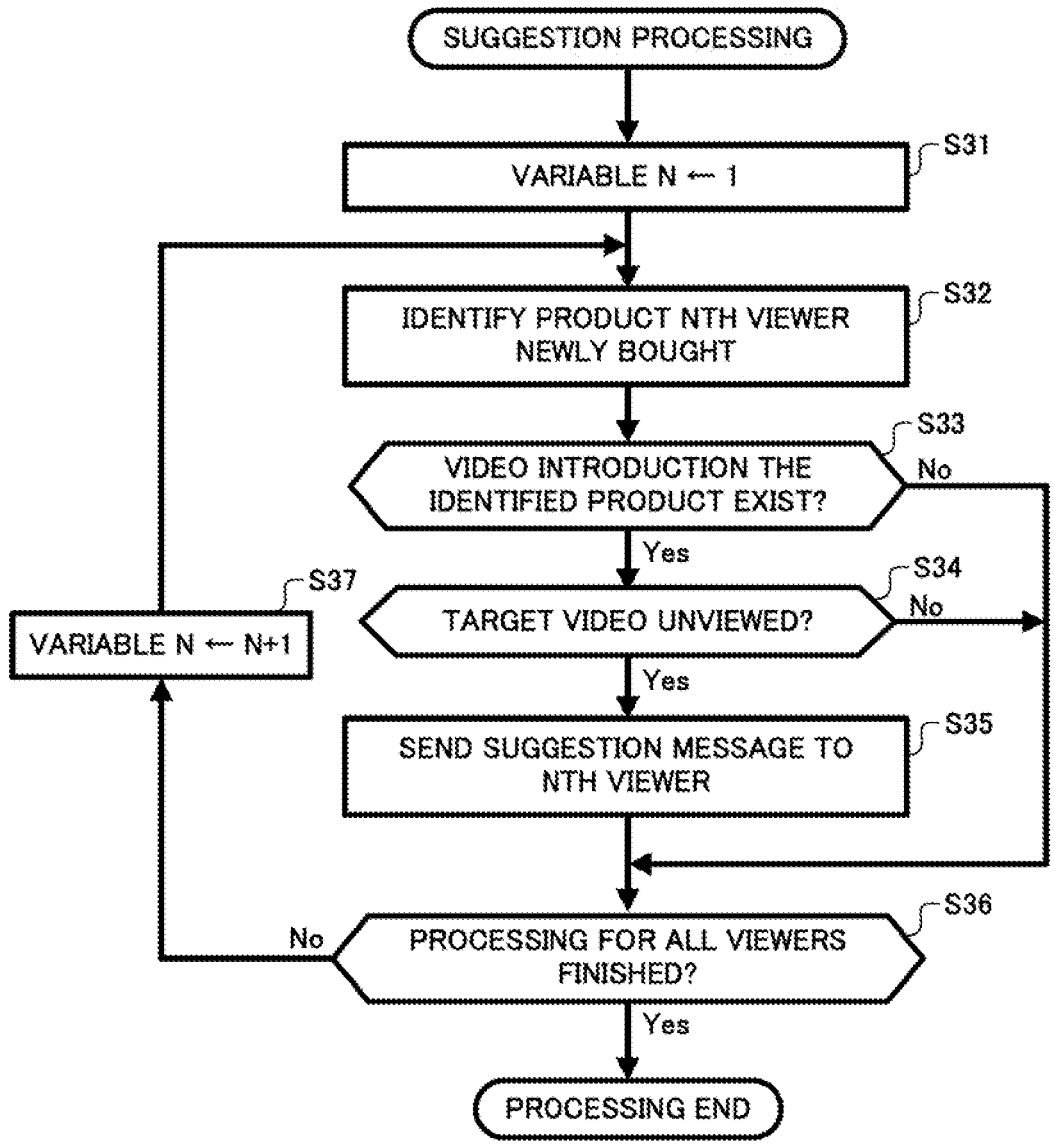
FIG. 17 is a flowchart for describing suggestion processing according to Embodiment 2.

The following describes the operation of the management server 600 with reference to FIGS. 17 and 18. FIG. 17 is a flowchart for describing suggestion processing according to Embodiment 2. FIG. 18 is a flowchart for describing registration processing according to Embodiment 2.

First, the suggestion processing of FIG. 17 is described. This suggestion processing is executed repeatedly at regular intervals.

The management server 600, first, sets 1 as an initial value to a variable N. (Step S31). This variable N is, for example, information for referring to viewers in sequence in the viewer management information 132 of FIG. 5 described above.

The management server 600 identifies a product that is newly bought by the Nth viewer (step S32). For example, the controller 640 (the suggester 641) searches the purchase history information 133 of FIG. 6 described above using the viewer ID 132*a* of the Nth viewer in the viewer management information 132 of FIG. 5 described above as a key and identifies a product of which purchase date and time 133*d* corresponding to the same viewer ID 133*a* is the new purchased product ID 133*b* (newer than the date and time when the previous suggestion processing was performed). Note that, if there is no purchased product ID 133*b* with new purchase date and time 133*d*, the management server 600 proceeds with processing at step S36 described later.

The management server 600 determines whether or not there is a video introducing the product identified at step S32 above (step S33). For example, the controller 640 (the suggester 641) searches the above-described video management information 131 of FIG. 4 using the corresponding purchased product ID 133*b* in the purchase history information 133 of FIG. 6 described above as a key and determines whether there is a video introducing a product of the same product ID 131*b*.

When the management server 600 determines that there is no video for introducing the identified product (step S33; No), the management server 600 proceeds with processing at step S36 described later.

On the other hand, when the management server 600 determines that there is a video introducing the identified product (step S33; Yes), the management server 600 determines whether or not the target video is unviewed (step S34). For example, the controller 640 (the suggester 641) refers to the viewed video ID 132*d* of the Nth viewer in the viewer management information 132 of FIG. 5 described above to determine whether the Nth viewer has viewed the target video.

When the management server 600 determines that the target product is not unviewed (step S34; No), the management server 600 proceeds with processing at step S36 described later.

On the other hand, when the management server 600 determines that the target video is unviewed (step S34; Yes), the management server 600 sends a suggestion message to the Nth viewer (step S35). For example, the controller 640 (the suggester 641) generates a suggestion message IM as illustrated in FIG. 16 described above and transmits the suggestion message IM to the viewer terminal 400 used by the Nth viewer. The viewer terminal 400 that has received the suggestion message IM displays the suggestion message IM on the display 450. Then, the viewer who is interested in the video by the suggestion message IM presses the banner BN.

The management server 600 determines whether or not the processing for all viewers has been completed (step S36).

When the management server 600 determines that processing for all viewers has not been completed (step S36; No), the management server 600 adds 1 to the variable N (step S37). Then, the management server 600 returns the processing to step S32 described above.

On the other hand, when the management server 600 determines that the processing for all viewers has been completed (step S36; Yes), the management server 600 ends the suggestion processing.

Through such suggestion processing, a video introducing the purchased product is suggested to the viewer who purchased the product without watching the video introducing the product. This suggestion is timed right after a viewer makes a purchase, so the video is expected to be viewed at a high rate.

Next, the registration processing of FIG. 18 is described. This registration processing has a processing content in which step S41 is added to the registration processing of FIG. 13 described above. That is, the registration processing of FIG. 18 is the same as the registration processing of Embodiment 1 except for step S41. Therefore, the same processing content is briefly described.

First, the management server 600 determines whether or not there is a newly distributable video (step S11). When the management server 600 determines that there is no newly distributable video (step S11; No), the management server 600 proceeds with processing at step S13 described later.

On the other hand, when the management server 600 determines that there is a newly distributable video (step S11; Yes), the management server 600 creates an ad hoc group chat in association with the video (step S12).

The management server 600 sets 1 as an initial value to the variable N (step S13). The management server 600 identifies the product that is introduced in the video viewed by the Nth viewer (step S14).

The management server 600 determines whether or not the Nth viewer has purchased the target product (step S15). When the management server 600 determines that the Nth viewer has not purchased the target product (step S15; No), the management server 600 proceeds with processing at step S20 described later.

On the other hand, when the management server 600 determines that the Nth viewer has purchased the target product (step S15; Yes), the management server 600 determines whether or not the purchase is made within a certain period of time after viewing (step S16). When the management server 600 determines that the purchase is made within a certain period of time after viewing (step S16; Yes), the management server 600 proceeds with processing at step S17 described later.

On the other hand, when the management server 600 determines that the purchase is not made within a certain period of time after viewing (step S16; No), the management server 600 determines whether or not the video is the suggested video (step S41). For example, the controller 640 (the detector 642) determines whether or not the video suggested to the viewer by the suggestion message IM as illustrated in FIG. 16 has been viewed.

When the management server 600 determines that the video is not the suggested video (step S41; No), the management server 600 proceeds with processing at step S20 described later.

On the other hand, when the management server 600 determines that the video is the suggested video (step S41; Yes), the management server 600 transmits an invitation message to the Nth viewer (Step S17).

The management server 600 determines whether or not there is a response indicating acceptance (step S18). When the management server 600 determines that there is no response indicating acceptance (step S18; No), the management server 600 proceeds with processing at step S20 described later.

On the other hand, when the management server 600 determines that there is a response indicating acceptance (step S18; Yes), the management server 600 registers the information of the Nth viewer to an ad hoc group chat (step S19).

The management server 600 determines whether or not the processing for all viewers has been completed (step S20). When the management server 600 determines that processing for all viewers has not been completed (step S20; No), the management server 600 adds 1 to the variable N (step S21). Then, the management server 600 returns the processing to step S14 described above.

On the other hand, when the management server 600 determines that the processing for all viewers has been completed (step S20; Yes), the management server 600 ends the registration processing.

Through such registration processing, not only viewers who have viewed the video and purchased the products introduced in the video but also viewers who have viewed the video after purchasing the product before viewing the video introducing the product are registered to an ad hoc group chat corresponding to the video. Therefore, in the ad hoc group chat, the viewers who actually purchased the product introduced in the video exchange candid opinions about the product by chatting. As a result, beneficial interaction between viewers is promoted. In addition, the streamer can also listen to viewers' opinions on the video, which can be expected to be put in use in a future distribution.

OTHER EMBODIMENTS

The above-described Embodiments 1 and 2 describe a case in which an invitation message MS as illustrated in FIG. 8 is sent to a viewer terminal 400 of the viewer detected by the detector 142, 642 and, when a response indicating acceptance is obtained, the viewer is registered to the ad hoc group chat. However, the sending of the invitation message MS may be omitted, and the viewer detected by the detector 142, 642 may be automatically registered to the ad hoc group chat.

Although the above Embodiments 1 and 2 describe a case of registering a streamer to an ad hoc group chat generated by the generator 141 (an ad hoc group chat at an initial stage), instead of the streamer, or together with the streamer, the provider of the product may also be registered to the ad hoc group chat. In this case, the provider of the product can hear candid opinions about the product from the viewers who actually purchased the product, which is expected to be put in use for future product development and/or the like.

Although the above-described Embodiments 1 and 2 describe a case in which a viewer who satisfies conditions is registered to an ad hoc group chat of a messenger service, the case is only an example and any cases involving registering of viewers to a group of a social media can be adopted to the invention. For example, a viewer who satisfies the conditions may be registered to a group of various services having a community function (for example, SNS, a blog, and/or the like).

In the above-described Embodiments 1 and 2, the program executed by the management server 100, 600 and/or the like can also be stored in and distributed through a computer-readable storage medium such as a compact disc read-only memory (CD-ROM), a digital versatile disc (DVD), a magneto-optical disk (MO), a USB memory, a memory card, and/or the like. By installing such a program in a specific or general-purpose computer, the computer can be made to function as the management server 100, 600 in the above-described Embodiments 1 and 2.

Additionally, the above-described program may be stored in a disk device of a server device on a communication network such as the Internet and, for example, may be superimposed on a carrier wave so that the program can be downloaded to a computer. Further, the above-described processing can also be achieved by executing the program while transferring the program over a communication network. Furthermore, the above-described processing can also be achieved by executing the program in such a way that a server device executes all or part of the program while another computer sends and receives information pertaining to the processing over a communication network.

Note that, in a case in which the aforementioned functions are realized by operating system (OS) sharing or by cooperation between the OS and an application and/or the like, only the functions that are performed by other than the OS may be stored in and distributed through the aforementioned recording medium or may be downloaded to a computer.

[1] A server device comprising one or more processors, performing the processing of:
- generating a group for viewers of a video introducing a product to interact with each other on social media;
- detecting a viewer who has viewed the video and purchased the product; and
- registering the detected viewer to the group.

[2] The server device according to [1], wherein
at least one of the one or more processors further performs the processing of:
- inviting the detected viewer to the group; and
- receiving a response from the invited viewer, and
- registration to the group is carried out when the response indicating acceptance is received.

[3] The server device according to [1] or [2], wherein
at least one of the one or more processors further performs the processing of suggesting the video to a viewer who purchased the product without viewing the video, and the detected viewer includes a viewer who viewed the suggested video.

[4] The server device according to any one of [1] to [3], wherein, in addition to the detected viewer, an introducer who introduces the product in the video is also registered to the group.

[5] The server device according to any one of [1] to [3], wherein, in addition to the detected viewer, a provider of the product is also registered to the group.

[6] A management method by which a computer performs:
- generating a group for viewers of a video introducing a product to interact with each other on social media;
- detecting a viewer who has viewed the video and purchased the product; and
- registering the detected viewer to the group.

[7] A computer-readable recording medium on which is recorded a program for causing a computer to perform:
- generating a group for viewers of a video introducing a product to interact with each other on social media;
- detecting a viewer who has viewed the video and purchased the product; and
- registering the detected viewer to the group.

INDUSTRIAL APPLICABILITY

The present disclosure may be suitably employed in generation of a group capable of promoting beneficial interactions between viewers.

REFERENCE SIGNS LIST

1, 2 Distribution system
100, 600 Management server
110 Transmitter
120 Receiver
130 Storage
131 Video management information
132 Viewer management information
133 Purchase history information
134 Group management information
140, 640 controller
141 Generator
142, 642 Detector
143 Inviter
144 Reception
145 Registrar
641 Suggester
200 Distribution server
210 Transceiver
220 Storage
230 Controller
231 Manager
232 Distribution controller
300 Streamer terminal
310 Imager
320 Transceiver
330 Operation reception
340 Storage
350 Controller
351 Compositor
352 Deliverer
360 Display
400 Viewer terminal
410 Transceiver
420 Operation reception
430 Storage
440 Controller
450 Display
500 Information processing device
501 CPU
502 ROM
503 RAM
504 NIC
505 Image processor
506 Audio processor
507 Secondary storage
508 Interface
509 Imaging unit
510 Operation unit
511 Display unit
900 Internet

The invention claimed is:
1. A server device, comprising:
a memory; and
one or more processors, wherein
at least one of the one or more processors perform configured to:
provide, to viewers, a video introducing a product, the video being associated with a video identifier, the product being associated with a product identifier, the video identifier and the product identifier stored in the memory;
generate a group for viewers who viewed the video introducing a product to interact with each other on social media;

detect a viewer from the viewers who has viewed the video associated with the video identifier and purchased the product associated with the product identifier based on a correlation of the video identifier and the product identifier in the memory; and register the detected viewer to the group.

2. The server device according to claim 1, wherein at least one of the one or more processors is further configured to:

invite the detected viewer to the group; and receive a response from the invited viewer, and registration to the group is performed based on determining the response indicating acceptance is received.

3. The server device according to claim 1, wherein at least one of the one or more processors is further configured to provide a recommendation of the video to a viewer who purchased the product without viewing the video, and the detected viewer includes a viewer who viewed the suggested video.

4. The server device according to claim 1, wherein, an introducer who introduces the product in the video is also registered to the group.

5. The server device according to claim 1, wherein, a provider of the product is registered to the group.

6. A management method performed by at least one processor, the management method comprising:

providing, to viewers, a video introducing a product, the video being associated with a video identifier, the product being associated with a product identifier, the video identifier and the product identifier stored in a memory;

generating a group for viewers who viewed the video introducing a product to interact with each other on social media;

detecting a viewer from the viewers who has viewed the video associated with the video identifier and purchased the product associated with the product identifier based on a correlation of the video identifier and the product identifier in the memory; and registering the detected viewer to the group.

7. A non-transitory computer-readable recording medium storing instructions, which when executed by a processor cause the processor to execute a method comprising:

providing, to viewers, a video introducing a product, the video being associated with a video identifier, the product being associated with a product identifier, the video identifier and the product identifier stored in the memory;

generating a group for viewers who viewed the video introducing a product to interact with each other on social media;

detecting a viewer from the viewers who has viewed the video associated with the video identifier and purchased the product associated with the product identifier based on a correlation of the video identifier and the product identifier in the memory; and registering the detected viewer to the group.

8. The server device according to claim 1, wherein at least one of the one or more processors is configured to:

detect a viewer from the viewers who has purchased the product within a certain period of time from a date and time when the viewer viewed the video; and register the detected viewer to the group.

* * * * *